United States Patent [19]
Da Costa Vieira et al.

[11] 4,049,954
[45] Sept. 20, 1977

[54] DEVICE FOR ACCURATE MEASUREMENT OF THE DIMENSIONS OF AN OBJECT BY ULTRASONIC WAVES

[75] Inventors: David Da Costa Vieira, Puyricard; Jean-Pierre Dufayet, Aix-en-Provence; Maurice Lemaire, Manosque, all of France

[73] Assignee: Commissariat a l'Energie Atomique, Paris, France

[21] Appl. No.: 677,888

[22] Filed: Apr. 19, 1976

[30] Foreign Application Priority Data

Apr. 22, 1975 France .................................. 75.12463
Mar. 9, 1976 France .................................. 76.06727

[51] Int. Cl.² .............................................. G01S 9/68
[52] U.S. Cl. ............................. 235/151.32; 340/1 R; 73/67.7
[58] Field of Search ................. 235/151.32, 151.3; 340/1 R, 15, 15.5 DP, 3 D, 3 R; 73/69, 67.7; 343/13 R

[56] References Cited

U.S. PATENT DOCUMENTS

| | | | |
|---|---|---|---|
| 3,176,263 | 3/1965 | Douglas | 73/69 X |
| 3,346,065 | 10/1967 | Bourquard | 73/69 X |
| 3,346,067 | 10/1967 | Schroeder | 73/69 X |
| 3,454,922 | 7/1969 | Dory | 340/3 R X |
| 3,500,301 | 3/1970 | Meier | 73/67.7 X |
| 3,540,265 | 11/1970 | Lynnworth | 73/67.7 |
| 3,694,800 | 9/1972 | Frank | 340/1 R |
| 3,744,302 | 7/1973 | O'Meara, Jr. | 340/3 R X |
| 3,783,679 | 1/1974 | Jackson | 73/67.7 |
| 3,918,269 | 11/1975 | Kitada | 73/67.7 |
| 3,942,361 | 3/1976 | Rath et al. | 73/67.7 |

*Primary Examiner*—Edward J. Wise
*Attorney, Agent, or Firm*—William R. Woodward

[57] ABSTRACT

In a device for accurately measuring the dimensions of metallic tubes and the like by supersonic waves in a liquid medium, typically water, obstructions providing reflecting boundaries that are partially reflecting and partially transparent for acoustic waves are provided at different distances from the transmitter-receiver between the latter and the object being measured and echoes of transmitted pulses from the reflecting boundaries of the obstructions and from those of the object being measured are processed in order to obtain the measured dimensions in a manner unaffected by changes in the velocity of propagation of the waves in the liquid medium because of temperature effects and the like. The pulse processing involves obtaining electrical signals proportional to the time delay between pairs of pulses and then comparing the time delays relating to precisely known distances with time delays relating to distances being measured. When the tube being measured is empty or otherwise filled with a poor medium for acoustic transmission, transmitter-receivers are provided on opposite sides of the tube and for checking fully the uniformity of tube thickness and diameters. A pair of cylindrical shells of diameter greater than the tube extending part way only into the path of the ultrasonic waves most conveniently provides the obstructions of precisely known dimensions.

10 Claims, 11 Drawing Figures

DEVICE FOR ACCURATE MEASUREMENT OF THE DIMENSIONS OF AN OBJECT BY ULTRASONIC WAVES

This invention relates to an ultrasonic measurement device which serves to determine the dimensions of an object with a high degree of accuracy in the direction of propagation of ultrasonic pulses emitted by probes.

The invention is primarily applicable to the measurement of metallic tubes in which it is important to determine the external and internal tube diameters with high relative precision (of the order of a few ten-thousandths of a millimeter).

Devices which utilize the reflection of ultrasonic pulses from the various surfaces constituting the object are already generally known and serve to determine the distance between such surfaces as a function of intervals of time of reception of echos corresponding to these pulses. This type of measurement calls for a precise knowledge of the velocity of propagation of sound waves within the medium which constitutes the object and within a wave transmission medium which surrounds said object.

In actual practice, measurements of this type are performed on automatic test benches in which, for reasons of acoustic coupling, the measuring device is usually immersed in water (or in any other liquid that similarly improves the acoustic coupling of transmitters, reflectors, receivers, etc., and can hence be referred as a "couplant" liquid or medium). This acoustic coupling is essential for impedance-matching between the transmitting and receiving device and the media which transport the ultrasonic waves. Owing to the interposition of the water, the velocity of sound in this couplant medium is a parameter which is employed in the calculations. Since the velocity of sound in water varies to an appreciable extent as a function of temperature (approximately $2 \times 10^{-3}/°$ C), it is very difficult to obtain measurements with the requisite degree of accuracy (for example 1 micron in respect of diameters of the order of 6 to 10 mm) unless this variation in temperature is taken into account.

Devices are already known (as disclosed in French Pat. No. 2,041,006), which make it possible to obtain partial freedom from variations in the velocity of sound in the couplant medium by determining the velocity of propagation within the medium, measure the time interval which elapses between emission and reception of the echo returned by the first barrier.

However, this type of device has disadvantages since:

1. the vibrations of the transmitter at the time of emission modify the distance between transmitter and first barrier and do not permit accurate calibration on the basis of this distance which varies during the emission.

2. the reference distance D should preferably be located as close as possible to the object to be measured in order to reduce the margin of possible error arising from heterogeneity of temperature in the couplant medium. It was in fact necessary in this prior art device to take into account the total distance between transmitter and first barrier.

3. the distance between transmitter and first barrier must necessarily by determined with high precision, which is a matter of difficulty when the transmitter has to be replaced.

It is an object of the present invention to make it possible to overcome the disadvantages mentioned above resulting from the temperature-dependent variations of the velocity of sound within the couplant material such as water, for example, and to provide a device for measuring the dimensions of an object with a high degree of accuracy, independently of the velocity of propagation of sound in the couplant medium.

Summary of the Invention

Essentially, the device of the present invention comprises at least one ultrasonic probe which operates as an transmitter-receiver for ultrasonic pulses, at least two reflecting barriers for the ultrasonic pulses, these barriers being placed on the path of the ultrasonic pulses, means for placing an object whose dimensions are to be measured in the direction of propagation of the ultrasonic pulses, means for producing electric signals proportional in value to the time intervals between the reception on each probe of the various echoes corresponding to the reflections of the ultrasonic pulses from the barriers and from the object, and electronic processing means for determining the dimensions of the object by means of the aforesaid electric signals.

In one preferred embodiment of the invention which is applied to the case in which the interior of the object does not transmit the ultrasonic pulses or transmits them with low efficiency, the device comprises two probes and three barriers. It is in fact necessary in that case to employ two probes respectively placed opposite sides of the object by reason of the fact that, if the object is hollow or filled with loose or incoherent material, the ultrasonic pulses are not usually transmitted through the interior of the object. Accordingly, the two probes make it possible to receive the echoes corresponding to the two sides or faces of the object. The three barriers have different functions: the first two barriers are located outside the object on the side of it and, as will be explained later, serve to measure the velocity of sound in the couplant medium. When two probes are employed, three barriers are necessary whilst the third barrier which is located on the other side of the object with respect to the first two defines with one of the first two barriers a reference length which covers the overall dimension of the object to be measured.

In the case in which the hollow object is filled with a couplant liquid, the echoes respectively reflected from the two faces of the object can be directed by hand towards a single transmitter-receiver, those reflected at the remote face passing twice through the internal couplant medium. In this case, only one probe and only two barriers are employed.

In accordance with the preferred embodiment of the invention, the device further comprises:

means for producing electric signals having values proportional to the time intervals which elapse between reception on two probes Ea and Eb of the various echoes corresponding to the reflections of the ultrasonic pulses from said barriers and from said object;

electronic analog processing means for determining the dimensions of said object by means of said signals.

The device in accordance with the invention also comprises electronic elements having an adjustable gain for combining the signals corresponding to the time intervals which elapse between the different echoes and for producing a signal corresponding to the dimensional variation of an object with respect to a reference object or calibration standard, the gain of an amplifier being adjusted so as to deliver a signal having a zero output in respect of said calibration standard, there being thus observed relative variations in diameter of a tube for example, with respect to a calibration standard tube.

In order to introduce an appreciable simplification in the mechanical construction and positioning of the different components of the device for continuously measuring the dimensions of a tube, the device in accordance with a preferred embodiment of the invention comprises N pairs of probes placed around the cylindrical tube to be measured as well as means for sequentially switching each of the N pairs of probes. This makes it possible to dispense with the need for carrying out a relative movement of rotation between the tube and the probes; it is merely necessary to displace the tube along its axial direction. Three pairs of probes are advantageously employed, each probe being intended to operate as a transmitter-receiver. The two probes of each pair are placed opposite to each other on each side of the tube which is to be measured and has an external radius $R_1$. The probes emit ultrasonic pulses which propagate in directions at right angles to the generator-lines of said tube.

In one embodiment of the invention, the device advantageously comprises a first barrier constituted by a cylindrical tube of external radius $R_2$ which is coaxial with the tube being measured, with $R_2 > R_1$, the external surface of radius $R_2$ of said first barrier being located on a portion of the emission ultrasonic field of each probe, and a second barrier constituted by a cylindrical tube of radius $R_3$, with $R_3 > R_2$, the external surface of radius $R_3$ of said second barrier being located on a portion of the emission ultrasonic field of each probe. A couplant liquid surrounds the probes and the external surfaces of the tube to be measured as well as the two tubes which constitute the barriers.

Further properties and advantages of the invention will become apparent from the following description of exemplified embodiments which are given by way of explanation without any limitation being implied, reference being made to the accompanying drawings, wherein:

Figure 1:
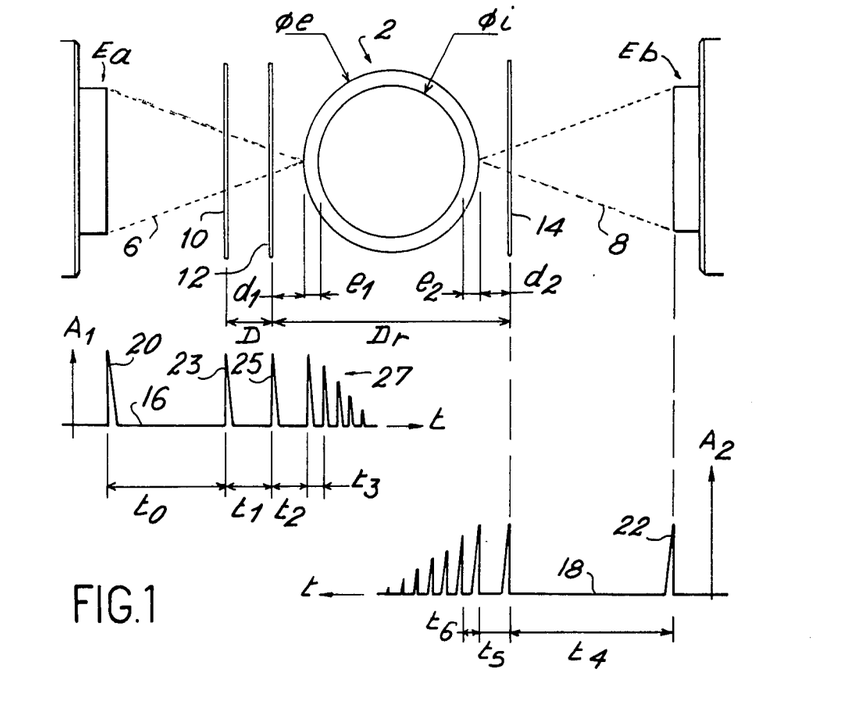
FIG. 1 is a schematic illustration of a device in accordance with the invention comprising two ultrasonic probes and three barriers associated with the object whose internal and external diameter is to be measured, there being also shown a diagram of the "echo" pulses received by the probes as a function of time.

As shown in the diagrammatic sectional view of FIG. 1, the device in accordance with the invention comprises two probes Ea and Eb which send two ultrasonic pulse beams such as the beams 6 and 8 in the direction of a cylindrical tube 2 to be measured, which has an external diameter $\Phi e$ and an internal diameter $\Phi i$. Three barriers constituted for example by wires or screens 10, 12 and 14 are placed on each side of the tube 2 on the path of the ultrasonic pulse beams. The first two barriers 10 and 12 (namely wires in this embodiment) are separated by the distance D and the barriers 12 and 14 are separated by the distance Dr. The distances D and Dr are standard distances which are measured once and for all, which are known and invariable.

The example which is illustrated relates to the measurement of external and internal diameters of a cylindrical tube 2 by measuring the variations in these diameters with respect to a standard tube, this type of measurement being a preferred application of the invention. However, the device which is illustrated can serve to measure the internal and external dimensions of any hollow component. It is worthy of note that, in the event of measurement of a metallic tube, for example a steel tube for which the velocity of sound within the tube is known, it is only necessary to employ a single standard tube. On the other hand, it will be necessary to employ two standard tubes having different thicknesses if that velocity is not known. The measuring head which comprises the two probes Ea and Eb and the three barriers 10, 12 and 14 are placed in a tank (not shown) which preferably contains water and more generally a couplant liquid. If it is desired to perform a continuous measurement of the diameters of the tube 2, a helical movement is imparted to the tube by driving means (not shown) along the axis at right angles to the plane of FIG. 1. In an alternative embodiment, the tube 2 is driven in a movement of translation along its axis and the measuring head comprising the two probes and the three barriers is driven in a movement of rotation about the axis of the tube 2. The two probes operate in synchronism, each probe being intended to perform an emitting function, then a receiving function in succession.

In a preferred embodiment of the invention, the three barriers 10, 12 and 14 can each be constituted by a single steel wire 0.15 mm in diameter. These three barriers generate echoes at predetermined and constant time intervals since their relative distances are invariable. If it is desired to observe the different diameters of the tube 2 in an equatorial plane, the tube can be rotated while allowing the measuring head to remain stationary or else the measuring head can be caused to rotate about the tube. In the diagram of FIG. 1 which illustrates the measuring head, there are shown in the same figure the curves 16 and 18 which indicate the different echoes received and the pulses transmitted by the two transceiver heads of the ultrasonic probes Ea and Eb. The amplitudes $A_1$ and $A_2$ of the different echos are represented as a function of the period $t$. The time interval $t_0$ elapses between the emission of the pulse represented by the peak 20 and the reception of the first echo 23 produced by reflection from the barrier 10. It is apparent that the time interval $t_0$ corresponds in the same manner as the following time intervals to a round trip of the ultrasonic pulse which is reflected from a barrier. The period $t_1$ corresponds to the time interval which elapses between the instants of reception by the probe Ea of the echoes 23 and 25 arising from the presence of the two barriers 10 and 12; the period $t_2$ is the time interval which elapses between the instants of reception of the echoes produced by the barrier 12 and the external surface of the tube 2 located opposite to the probe Ea, and the period $t_3$ is the time interval which elapses between the instants of reception of the echoes on the internal and external faces of the tube 2. Similarly on the curve 18, the peak 22 corresponds to the emission of a pulse by the ultrasonic probe Eb, the period $t_4$ corresponds to the time-duration of the two-trip traversal of the sound wave between the probe Eb and the barrier 14, the period $t_5$ is the time-duration of the round trip of the pulse between the barrier 14 and the external surface of the tube 2 located opposite to the probe Eb, and the period $t_6$ is the time interval which elapses between the instants of reception of echoes arising from reflections of the pulse between the internal and external faces of the tube 2. The echoes 27 correspond to multiple reflections from the tube walls.

Reference being made to FIG. 1, it is apparent that we have:

$$\Phi e = Dr - (d_1 + d_2)$$

$$\Phi i = \Phi e - (e_1 + e_2) = Dr - (d_1 + d_2) - (e_1 + e_2)$$

If the velocities of sound in the water and in the metal constituting the tube 2 are designated by $C_E$ and $C_m$, we have:

$$\Phi e = Dr - \tfrac{1}{2} C_E (t_2 + t_5)$$

$$\Phi i = Dr - \tfrac{1}{2} C_E (t_2 + t_5) - \tfrac{1}{2} C_m (t_3 + t_6)$$

The sound velocity $C_E$ in water and the sound velocity $C_m$ in the material constituting the tube being determined, a measurement of the time intervals $t_2$, $t_3$, $t_5$ and $t_6$ makes it possible to calculate $d_1$, $d_2$, $e_1$, and $e_2$. If it is permissible to consider that $C_m$ is constant under the conditions in which the measurements are performed, the same does not apply to $C_e$ which, as stated earlier, is dependent on the temperature to a very large extent. The parameter $C_E$ is continuously determined by measuring the time interval $t_1$ which represents the time-duration of the round-trip of the ultrasonic pulses between the two barriers 10 and 12 located opposite to the probe Ea. The barriers 10 and 12 being separated by the distance D, we have:

$$C_e = 2D / t_1$$

We may write:

$$\phi e = Dr - D \frac{t_2 + t_5}{t_1}$$

$$\phi i = Dr - D \frac{t_2 + t_5}{t_1} - \tfrac{1}{2} C_m (t_3 + t_6)$$

It is apparent that the measurements of $\Phi e$ and $\Phi i$ thus obtained do not depend on the temperature. Assurance of this may be gained by noting the fact that, in the case of any temperature variation, the distances D and Dr being constant, the time intervals $(t_2 + t_5)$ and $t_1$ will both vary proportionally and in the same manner as a function of variations in the velocity of sound in the water whilst the ratio $(t_2 + t_5)/t_1$ remain independent of the temperature. By virtue of the barriers 10, 12 and 14, there have thus been obtained measurements of the values $\Phi e$ and $\Phi i$ which are independent of the temperature; this corresponds to the intended objective.

By means of the device in accordance with the invention, it is sought to obtain two analog signals which are proportional to the real differences $\delta\Phi e$ and $\delta\Phi i$ of the external and internal diameters of the tube to be measured with respect to a standard tube (or more generally the external and internal dimensions of an object as compared with a standard object). This is obtained within a specialized computing unit which will be described hereinafter and operates in an analog mode, that unit being so designed as to permit the adjustment of certain elements with a view to having a zero voltage at the output terminals of the electronic device when the standard tube is in position.

Figure 2:
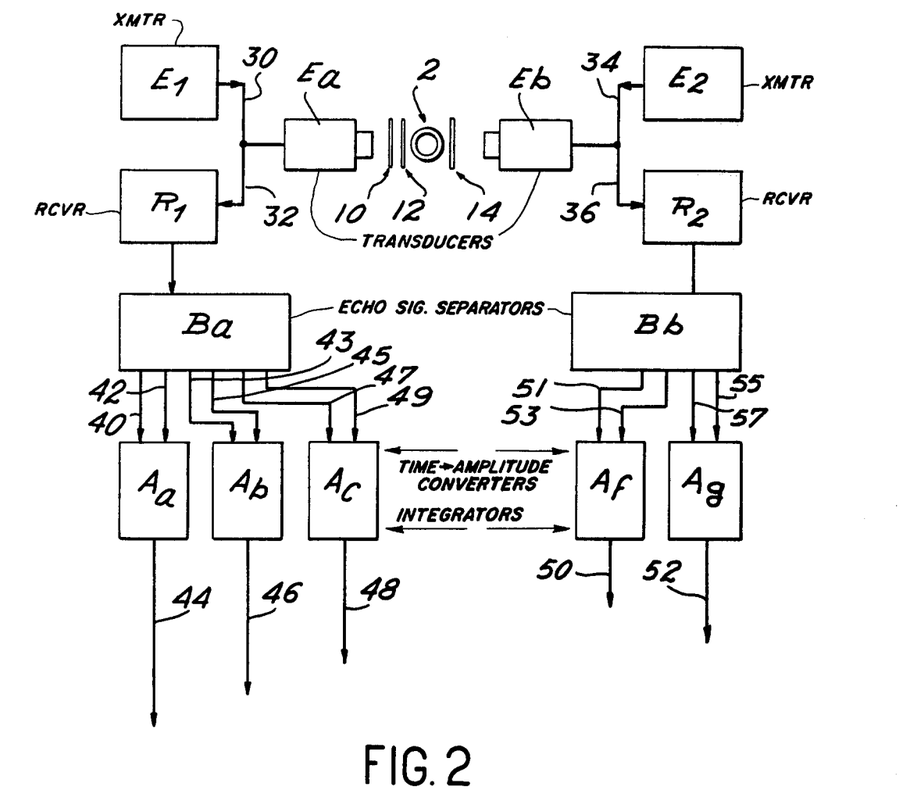
FIG. 2 is a block diagram of a first portion of the electronic device for processing the echoes collected by the probes.

A portion of the electronic circuit in accordance with the invention is shown in FIG. 2, in which the same reference symbols indicate the same elements as those illustrated in FIG. 1. The probe Ea is connected to an electronic device which serves to operate said probe as a transmitter when this latter is connected through the electrical line A to the transmitter $E_1$ and to operate the probe as a receiver when it is connected through the line 32 to the receiver $R_1$. Similarly, the probe Eb operates as an transmitter when it is connected through the line 34 to the transmitter $E_2$ and operates as a receiver when it is connected through the line 36 to the receiver $R_2$. The signals obtained from the receivers $R_1$ and $R_2$ are fed into two separators $B_a$ and $B_b$. The detailed circuit diagram of these separators is not described herein but is of a conventional type, sometimes referred to as distributors or demultiplexers, well known to anyone versed in the art. The separator $B_a$ transmits via channel 40 and pulse 23 corresponding to the reflection from the first barrier 10. Then the separator transmits via channel 42 the pulse corresponding to the second reflection represented by the peak 25 in FIG. 1. The time-amplitude converter $A_a$ which is also of conventional type has a double function; it has a counter for determining the time interval which elapses between the pulses supplied via the channels 40 and 42 and also performs an amplifying function; in other words, that converter delivers an output signal which is proportional to the time interval $t_1$ (with a coefficient of proportionality $K\lambda_1$), with the result that a signal having the value $K\lambda_1 t_1$ is obtained at the output on channel 44. The output signal is a voltage signal or a current signal. In a preferred embodiment of the invention, a voltage output is employed. As will be seen hereinafter, it is an advantage to make use of two independently adjustable amplification coefficients $K$ and $\lambda_1$ or in fact to make use of two amplifiers for the time-amplitude converter $A_a$.

Similarly, in the time-amplitude converter $A_b$, there are received, via the lines 43 and 45, pulses delivered by the separator $B_a$ and corresponding to the time interval $t_2$, with the result that a signal equal to $\lambda t_2$ is obtained at the output of the converter $A_b$ on lines 46. Similarly, at the output of the time-amplitude converter $A_c$, there is obtained on line 48 a signal which is proportional to $t_3$ having a value $\lambda t_3$. The pulses corresponding to the echoes are fed into the converter $A_c$ via lines 47 and 49.

The separator $B_b$ which is connected to the receiver $R_2$ of the probe $E_b$ sends on lines 51 and 53 the electrical pulses corresponding to the echoes due to the reflections from the barrier 14 and from the external surface of the tube 2 and sends on lines 55 and 57 the pulses corresponding to the echoes due to the reflections from the external and internal faces of the tube 2. A signal $kt_5$ is obtained on channel 50 at the output of the time-amplitude converter $A_f$ and a signal equal to $kt_6$ is obtained on line 52 at the output of the time-amplitude converter $A_g$; $k$ is a coefficient of proportionality in the same manner as $\lambda$, $\lambda_1$ and K.

Figure 3:
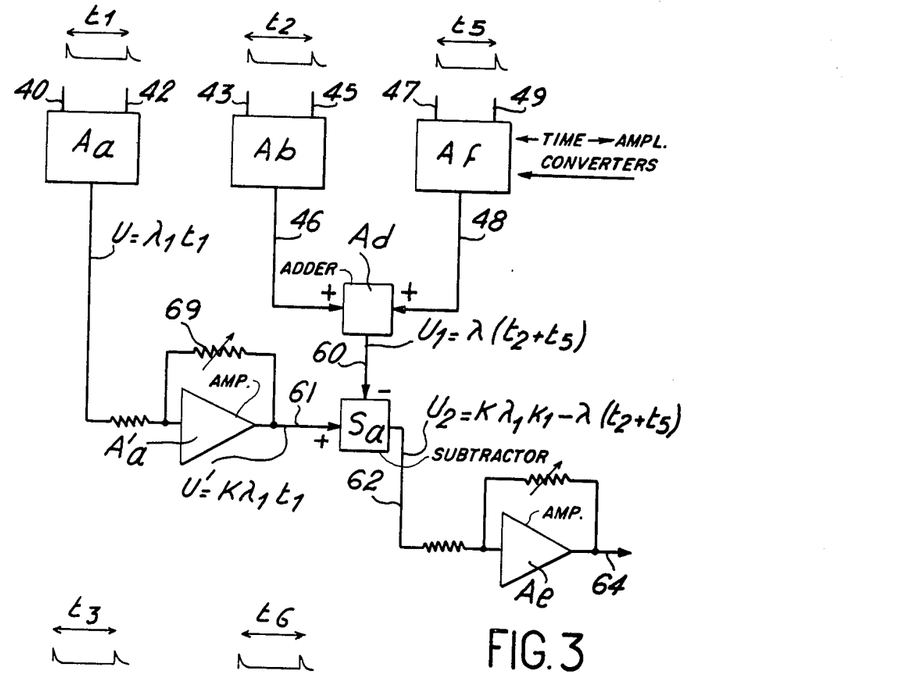
FIG. 3 is a block diagram of a second portion of the electronic device for processing echoes, this device being intended to enable measurement of the differences in external diameter of a tube with respect to a standard tube.

FIG. 3 shows in detail the electronic device which makes it possible to obtain at the output the variations in diameter of a tube with respect to a standard tube. The time-amplitude converters $A_a$, $A_b$, $A_f$ of FIG. 2 are again illustrated. A signal $u'$ having a value $K\lambda_1 t_1$ is obtained at the output on line 61 of the device $A_a$ after passing through the amplifier $A'_a$ and is fed into a subtractor $S_a$. The signals delivered by the devices $A_b$ and $A_f$ and having a value $\lambda t_2$ and $\lambda t_5$ are fed into an adder $A_d$ from which the signal $u_1 = \lambda (t_2 + t_5)$ passes out via line 60, then enters the subtractor $S_a$. At the output of the subtractor $S_a$, there is obtained a signal $u_2 = K\lambda_1 t_1 - \lambda(t_2 + t_5)$ which is fed into an amplifier $A_e$ having a gain $D/t_1$ so as to produce the corresponding signal at the output which is proportional to the external diameter of the tube as will be seen hereinafter.

The theoretical considerations which now follow will serve to gain a more complete understanding of the operation of the devices shown in FIGS. 2 and 3. When a standard tube having a diameter $(\Phi e)_0$ is introduced into the measuring head, the value of said diameter is given by the formula:

$$(\phi e)_0 = Dr - D \frac{(t_2 + t_5)}{(t_1)} = \frac{D}{t_1} \left[ \frac{Dr}{D} t_1 - (t_2 + t_5) \right]$$

This value corresponds to the value of the voltage signal $u_2$ obtained on line 62 of FIG. 3, this voltage being equal to $$u_2 = K\lambda_1 t_1 - \lambda(t_2 + t_5)$$

The value of the gain K of the amplifier $A'_a$ is adjusted by control means represented schematically by the arrow 69 so as to ensure that the output voltage of the amplifier $A_e$ is of zero value or in other words that the value at the input of said amplifier $A_e$ of gain $D/t_1$ is also zero. This results in a value of K which is given by the equation:

$$u_2 = K\lambda_1 t_1 - \lambda(t_2 + t_5) = 0$$

When this condition is satisfied, we have the relation:

$$\frac{t_1}{t_2 + t_5} = \frac{\lambda}{K\lambda_1}$$

It is important to note that this adjustment of the gain K is independent of the temperature of the water since the time intervals $t_1$, $t_2$ and $t_5$ which represent the times of travel of the ultrasonic waves through the water are always proportional to the distances (it is assumed that the temperature of the water in the vicinity of the measuring head is uniform and that the distances $d_1$ and $d_2$ are not dependent on the temperature). The ratio:

$$\frac{t_1}{t_2 + t_5} = \frac{D}{d_1 + d_2}$$

are dependent only on the dimensions of the standard tube and not on the sound velocity $C_e$ in the water.

When the tube to be examined is positioned on the measuring bench in the place of the standard tube, different time intervals are obtained, assuming that the temperature of the water has changed. Let these intervals of time $t_1 + \Delta t_1$, $t_2 + \Delta t_2 + \delta t_2$ and $t_5 + \Delta t_5 + \delta t_5$, wherein the $\Delta$ signs express the variations resulting from the temperature and the $\delta$ signs express the variations corresponding to the real dimensional difference $\delta\phi_e = \delta d_1 + \delta d_2$. The external diameter of said tube to be examined is therefore:

$$\phi_e = (\phi_e)_0 + \Delta\phi + \delta\phi_e = \frac{D}{t_1 + \Delta t_1} \left[ \frac{D_r}{D} (t_1 + \Delta t_1) \right.$$
$$\left. - (t_2 + \Delta t_2 + \delta t_2) - (t_5 + \Delta t_5 + \delta t_5) \right]$$

The terms $\Delta t_2$ and $\Delta t_5$ are, in the first order, the same as those which will be obtained in the case of the standard tube since the differences between the times of travel of the ultrasonic waves and the dimensional differences $\delta d_1$ and $\delta d_2$ are negligible with respect to these terms. There is therefore obtained at the output of the computing device shown in FIG. 3 a voltage $u_2$ which is:

$$u_2 = K\lambda_1 (t_1 + \Delta t_1) - \lambda (t_2 + \Delta t_2 + t_5 + \Delta t_5) - \lambda (\delta t_2 + \delta t_5) = -\lambda (\delta t_2 + \delta t_5)$$

since the gain K has been adjusted so as to permit compensation of the other terms.

Figure 4:
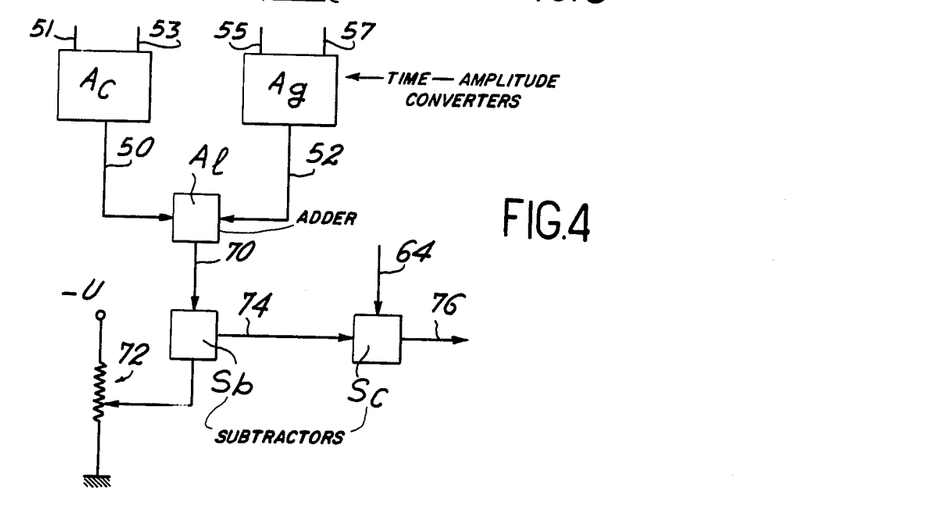
FIG. 4 is a block diagram of a portion of the electronic device in accordance with the invention for obtaining at the output the differences in internal diameter of a tube as a function of that of a standard tube.

In FIG. 4, there is shown a portion of the electronic device for measuring the differences in internal diameter of the tube under examination with respect to a standard tube. This device comprises the time-amplitude converters $A_c$ and $A_g$ which are shown in FIG. 2 and into which are fed the different pulses corresponding to the time intervals $t_3$ and $t_6$. These converters have the same gain $k$, with the result that signals which are proportional respectively to $kt_3$ and $kt_6$ are obtained at the output on lines 50 and 52. These signals are fed into an adding device $A_e$ which delivers on line 70 an output signal equal to $k(t_3 + t_6)$. The subtractor $S_b$ is supplied via channel 70 with a voltage derived from a potentiometer 72 of variable value and delivering a voltage $u_0$ which can be chosen equal to $-k(t_3 + t_6)_0$, wherein the index 0 relates to a calibrated standard tube. There is present at the output 74 of the subtractor $S_b$ a signal $u_3 = k(\delta t_3 + \delta t_6)$, where $\delta$ represents the real variations in the sum of the thicknesses $e_1 + e_2$, as will be seen hereinafter. By means of a circuit connected to the output line 64 of the amplifier $A_e$ shown in FIG. 3, the value of the variation in external diameter of the tube is fed into the subtractor $S_c$, thus making it possible to obtain at the output 76 the value of the variation in internal diameter of the tube with respect to a standard tube.

The principle of operation of the device shown in FIG. 4 is as follows: when measuring the difference in internal diameter $\Delta\phi_i$, the principle of calculation is the same as that which applies to the variations in external diameter. The initial expressions are the following:

$$\Phi i = \Phi e - (e_1 + e_2) = (\Phi i)_0 + \delta\Phi i (\Phi i)_0 + \delta\Phi i =$$
$$(\Phi e)_0 + \delta\Phi e = (e_1 + e_2)_0 - (\delta e_1 + \delta e_2)$$

The difference in internal diameter is therefore expressed by:

$$\delta\Phi i = \delta\phi_e - (\delta e_1 + \delta e_2) = \delta\phi_e - \tfrac{1}{2} C_m(\delta t_3 + \delta t_6)$$

The standard tube being placed on the measuring bench, the voltage $u_0$ is adjusted so as to ensure that the value of $u_3$ is zero in the case of said standard tube. It is apparent that, in the case of a tube having a different internal diameter, $u_3$ is then proportional to the time variations $\delta t_3 + \delta t_6$.

The entire device in accordance with the invention is adjusted in the laboratory by making use of a set of standard tubes having known dimensions in a highly precise manner. By successively producing deviations $\delta\Phi_e$ and $\delta\Phi_i$ from known values, it is thus possible to adjust the micrometer gains per volt on the outputs $\delta\Phi_e$ (output 64) and $\delta\Phi_i$ (output 76). These values can be displayed numerically by means of a device not shown in the figure.

In one example of construction, there has been employed a very short ultrasonic pulse obtained by transmitting to the probe crystal a voltage pulse having an amplitude of 130 volts and a width at the base of a few nanoseconds. The emission frequency is 33 Mc/s. The echoes received on the return trip have an amplitude of the order of one millivolt.

It is readily apparent that the time-amplitude converters can comprise threshold devices; the presence of these devices makes it possible to eliminate noise or echoes of insufficient amplitude which do not correspond to a barrier such as 10, 12, 14 or the cylindrical object to be tested.

Figure 5:
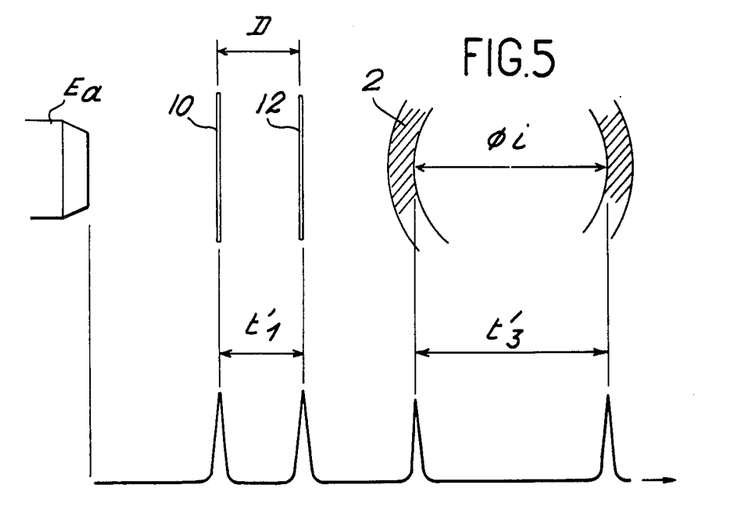
FIG. 5 is a diagram of one embodiment of the invention comprising a single probe and two barriers, this embodiment being applicable in the case in which the tube to be examined is filled with a couplant liquid.

There is shown diagrammatically in FIG. 5 an alternative embodiment of the device in accordance with the invention as applicable to the case in which the tube to be measured is filled with water, with the result that the echo signals returned by the walls of the tube 2 can be obtained in a single transmitter-receiver. This dispenses with the need for a second transmitter and for a third barrier located on the other side of the tube to be tested and having an internal diameter $\phi_i$. By virtue of the reference given by the two barriers located at the distance D, the value of the internal diameter for example is given by the formula:

$$\phi_i = D \frac{t'_3}{t'_1}$$

It is then possible to employ the same device as the one described earlier with only one probe Ea and two barriers. This device also serves to measure the external diameter $\phi_e$ of the tube 2. The main disadvantage of this device lies in the fact that it entails the need for a couplant medium which makes it possible to transmit the signals within the body to be tested.

Figure 6:
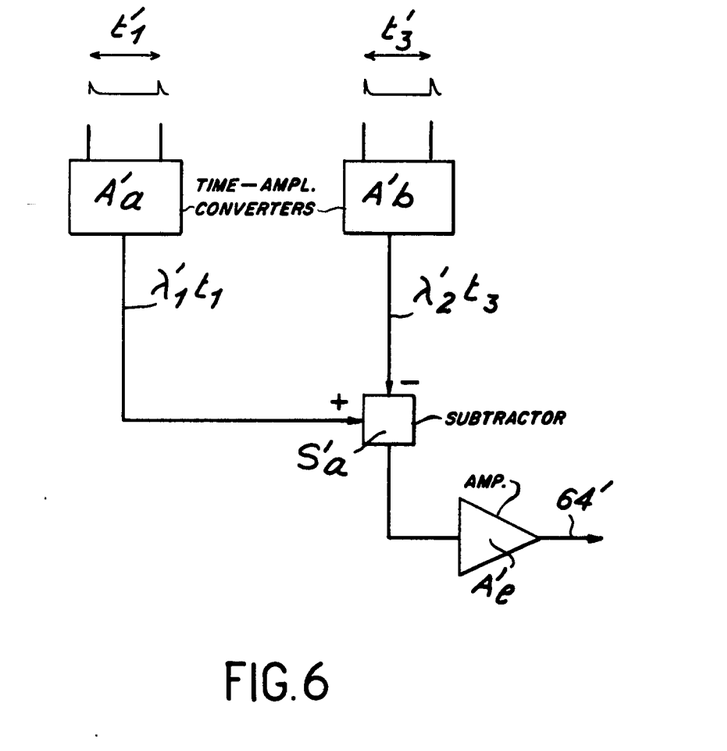
FIG. 6 is an electronic diagram of a measuring device in the case of a tube filled with a couplant liquid and of a single probe.

In this alternative embodiment as shown in FIG. 5, it is an easier matter to process the signal since only two time intervals $t'_1$ and $t'_3$ instead of three are employed for the determination of the internal diameter $\phi_i$. The device employed for the measurement of $\phi_i$ is obtained from the device shown in FIG. 3 by virtue of trivial modifications and is illustrated in FIG. 6.

The pulses corresponding to the echoes separated by time intervals $t'_1$ and $t'_3$ are transmitted to two time-amplitude converters $A'_a$ and $A'_b$ having gains $\lambda'_1$ and $\lambda'_3$.

The device further comprises a subtractor $S'_a$ connected at the output of the devices $A'_a$ and $A'_b$ and a final amplifier $A'_e$ having a gain $D/t'_1$.

The gain $\lambda'_1$ is adjusted so as to ensure that the output signal is zero in the case of a standard tube and the variations $\delta\phi_i$ are obtained at the output 64' when a tube to be examined is placed on the measuring head.

As can readily be understood, it is also possible to employ in accordance with the invention a device comprising two probes Ea and Eb and four reflecting screens disposed in two pairs on each side of the tube, thereby permitting greater flexibility in the use and the control of one probe by the other probe.

Figure 7:
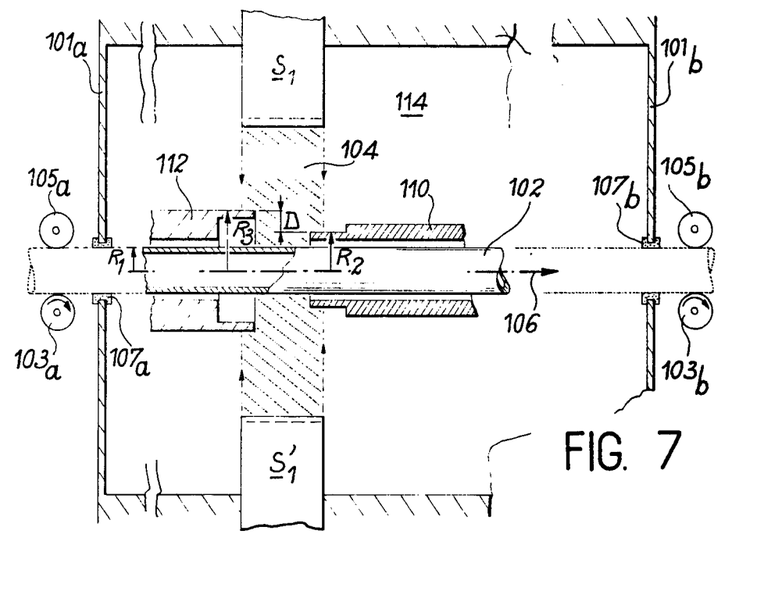
FIG. 7 is a sectional diagram of a preferred embodiment of the device in accordance with the invention.

Thus in FIG. 7, there is shown a sectional view of a preferred embodiment of the device in accordance with the invention. In this view are shown two probes $S_1$ and $S'_1$ placed in oppositely-facing relation on each side of the tube 102 of cylindrical shape to be tested. The field of ultrasonic wave emission relative to each transmitting probe is shown at 104 (shaded zone). The cylindrical tube 102 in which it is desired to measure the internal radius and the external radius is displaced in the direction of the arrow 106. The tube 102 passes through guides 107a and 107b placed in the opposite walls 101a and 101b of the waterfilled tank and is driven in axial translational motion by means of two pairs of rollers 103a–105a and 103b–105b placed outside the tank, each pair being constituted by a driving roller 103a or 103b and a pressure roller 105a or 105b. The transmitter-receiver probes $S_1$ and $S'_1$ are secured to a stationary frame 108. Similarly, the cylindrical tubes 110 and 112, one portion of which penetrates into the ultrasonic emission field 4 of the probes $S_1$ and $S'_1$, are stationary and rigidly fixed to the frame 108 by means of a rigid mechanical connection (not shown). The external surface of the cylinder 110 which constitutes the first barrier has an internal radius $R_2$ in that portion which is located in the emission field 104 of the probes $S_1$ and $S'_1$. Similarly, the second barrier 112 has an external radius $R_3$ and penetrates into the surface located inside the emission field 104 of the probes $S_1$ and $S'_1$. The couplant medium 114 placed between the frame 108, the transmitting probes $S_1$ and $S'_1$ and the different tubes can consist, for example, of water. The cylindrical tube 102 in which it is desired to measure the internal and external radii is filled with air, that is, a medium which does not transmit the ultrasonic pulses. The probes $S_1$ and $S'_1$ have a concave emission surface and this makes it possible to focus the rays on the external portion of the tube 102 to be measured. As explained in the foregoing, the measurement of the distance D which is equal to the difference between the radii $R_2$ and $R_3$ permits calibration of the sound velocity within the couplant medium as a function of the temperature and therefore an accurate measurement of the internal and external radii of the tube 102.

The device in accordance with the invention makes it possible to suppress any movement of rotation of the tube at the time of measurement of the internal and external radii in different azimuthal planes. The rigid connections between the barrier tube extensions 110 and 112 and the frame 108 ensure constancy of the distance between each probe and the different tubes, thus resulting in more reliable and more accurate measurements.

Figure 8:
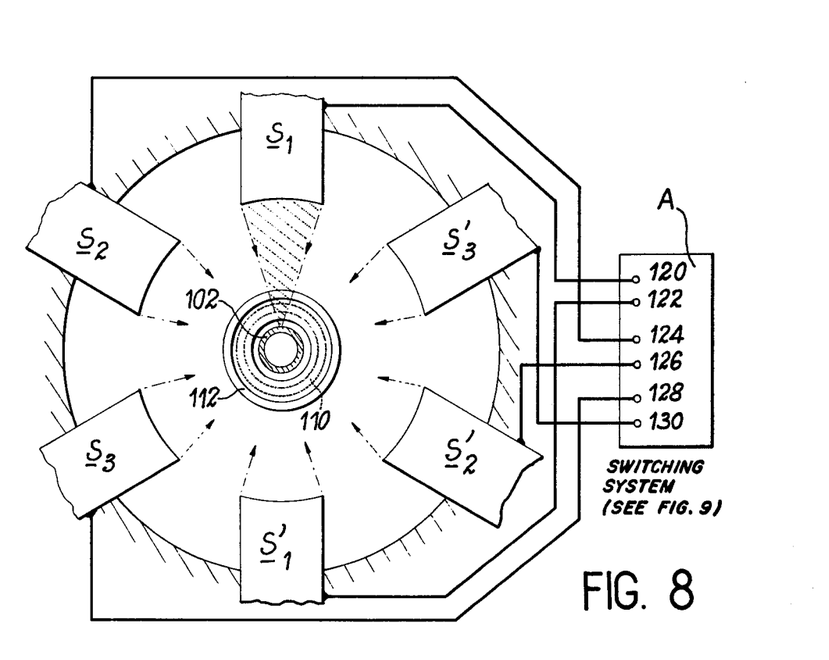
FIG. 8 is a top view of the device shown in FIG. 7 and shows the six transducer-transmitter-receivers employed for measuring the internal and external diameters of a tube and the associated electronic supply system.

A top view of the device in accordance with the invention is shown in FIG. 8 and the elements which are identical with those shown in FIG. 7 are designated by the same references. The device shown in this figure comprises three pairs of probes $S_1$, $S'_1$; $S_2$; $S'_2$; $S_3$, $S'_3$; these three pairs of probes are excited by a supply A comprising a clock which simultaneously excites a pair of probes and sequentially excites the three pairs of probes in accordance with time diagrams which will be more readily understood from a study of FIG. 9. The probes $S_1$, $S'_1$ are connected to the terminals 120 and 122 of the supply A and excited simultaneously. Similarly, the probes $S_2$, $S'_2$ which are connected to the terminals 124 and 126 are excited simultaneously and the probes $S_3$, $S'_3$ are excited simultaneously by the pulses derived from the terminals 128 and 130 of the supply A. The supply A is an electronic supply which serves to excite the different transducers of the probes.

Figure 9:
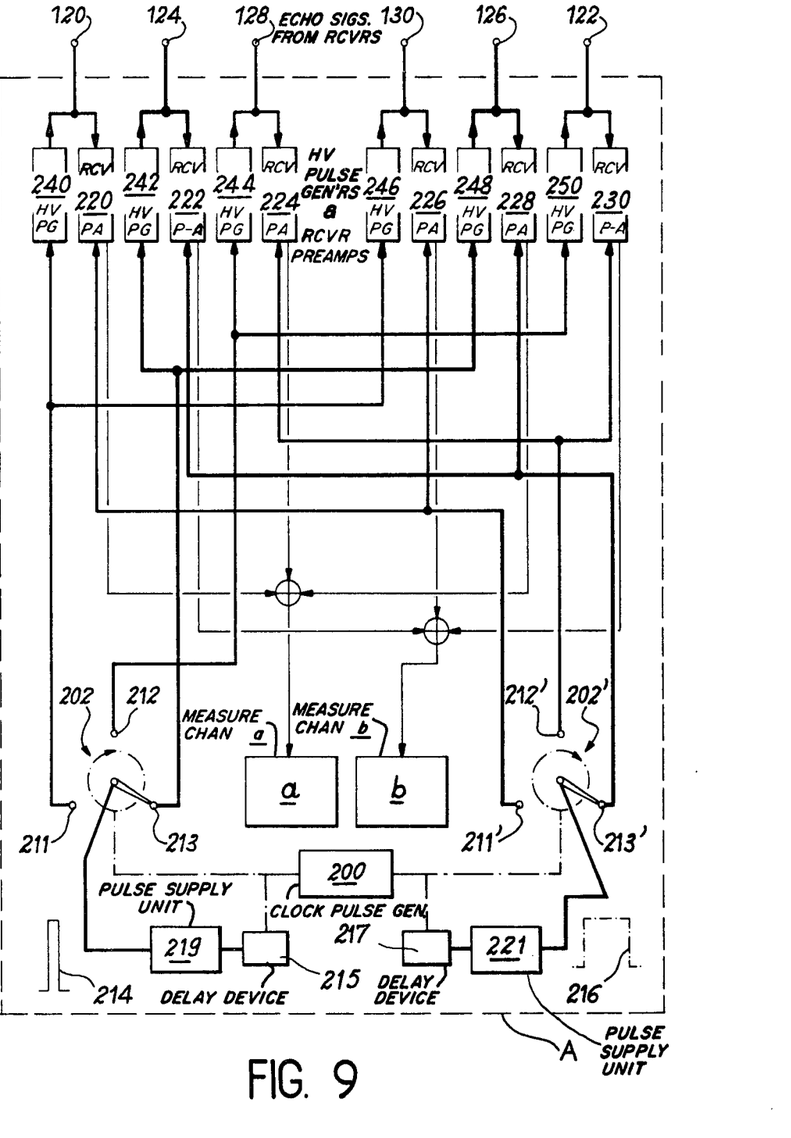
FIG. 9 is a block diagram of the electronic supply system shown in FIG. 8.

There is shown in greater detail in FIG. 9 the switching and supply system designated as A in FIG. 8. Electric pulses are delivered at uniform time intervals by a clock 200 and change-over both the transmission switch 202 and the reception switch 202'. The same switching signal which connects one of the three terminals 211, 212, 213 of each switch is transmitted to delay devices 215 and 217, there being connected to the outputs of said devices two supply units 219 and 221 which, after receiving the delayed clock pulses, transmit the signals 214 to the terminals of the switch 202 and the signals 216 to the terminals of the switch 202'. The signals for reception or opening of the gates 120, 122, 124, 126, 128 and 130 are represented at 216. The pulses 214 are transmitted to the terminals 120, 122, 124, 126, 128 and 130 by means of high-voltage pulse generators 240, 242, 244, 246, 248 and 250. The echo signals received by the different transducers and collected on the terminals 120, 122, 124, 126, 128 are fed after preamplification into the preamplifier circuits 220, 222, 224, 226, 228, 230 via two measuring channels, namely the channels $a$ and $b$, via the leads shown in the figure. If so desired, a conventional device (not shown) makes it possible to block the outputs of the probes which are not concerned by the measurement so as to collect on the measuring channels only the echoes received by the probes which have just been excited.

Figure 10:
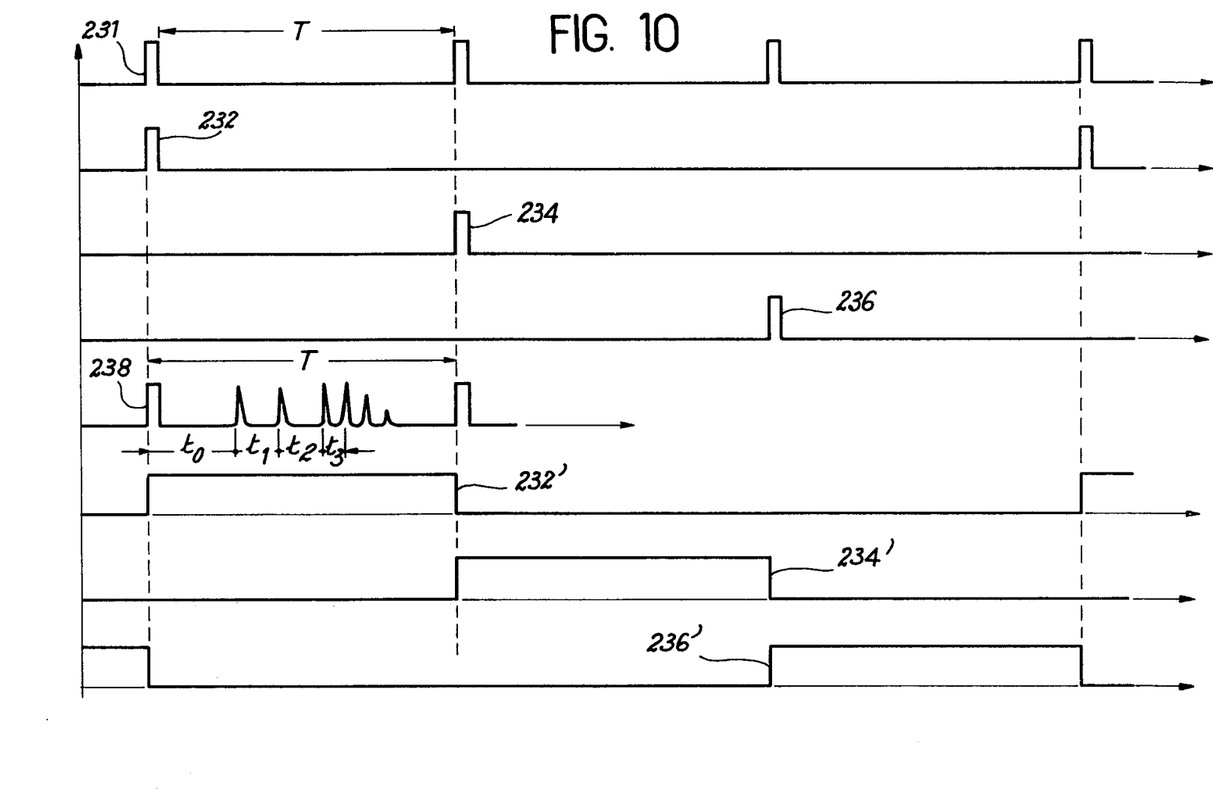
FIG. 10 is a time diagram of the excitations and echoes of the different pairs of transmitter-receiver probes.

FIG. 10 shows as a function of time the excitation diagrams of the different probes. A clock delivers signals 231 which are separated in time by the interval T. These signals are repetitions of the signal 214 of FIG. 9. The reception signals corresponding to the signal 216 of FIG. 9 are represented at 232', 234' and 236'. As can be seen in FIG. 9, each of these signals corresponds to the opening of gates corresponding to a pair of opposite probes. There have been shown on curve 232 the signals which appear on the terminals 120 and 122 and excite the probes $S_1$ and $S'_1$, on curve 234 the pulses which excite the probes $S_2$ and $S'_2$, and on curve 236 the pulses which excite the probes $S_3$ and $S'_3$. It is apparent from this time diagram that the probes are excited sequentially. The time interval T between two pulses which arrive on the two pairs of probes $S_1$ - $S'_1$ and $S_2$ - $S'_2$ is employed for collecting the echos reflected from the different barriers and collected by the pair of probes $S_1$ - $S'_1$ which accordingly operate as a receiver. On the curve 238, there are shown the different signals emitted and collected by the probe $S_1$ for example and corresponding to the echoes represented on FIG. 1. The period $t_0$ is the time interval which elapses between transmission and reception of the echo returned by the barrier 112 having a radius $R_3$; the period $t_1$ is the time interval between the instants of reception of the two echos returned by the barrier cylinder 110 and the barrier cylinder 112 which are separated by the distance D and make it possible to correct the variations in the velocity of propagation of sound as a function of temperature. The time interval $t_2$ elapses between the instants of reception of the echo signals returned by the second barrier and the external portion of the cylindrical tube 2 and the time interval $t_3$ elapses between the instants of reception of the signals returned by the internal and external surfaces of the cylindrical tube.

The electronic devices for processing the signals returned by the barriers and received by the probes which operate as receivers are identical for example with those described earlier.

Figure 11:
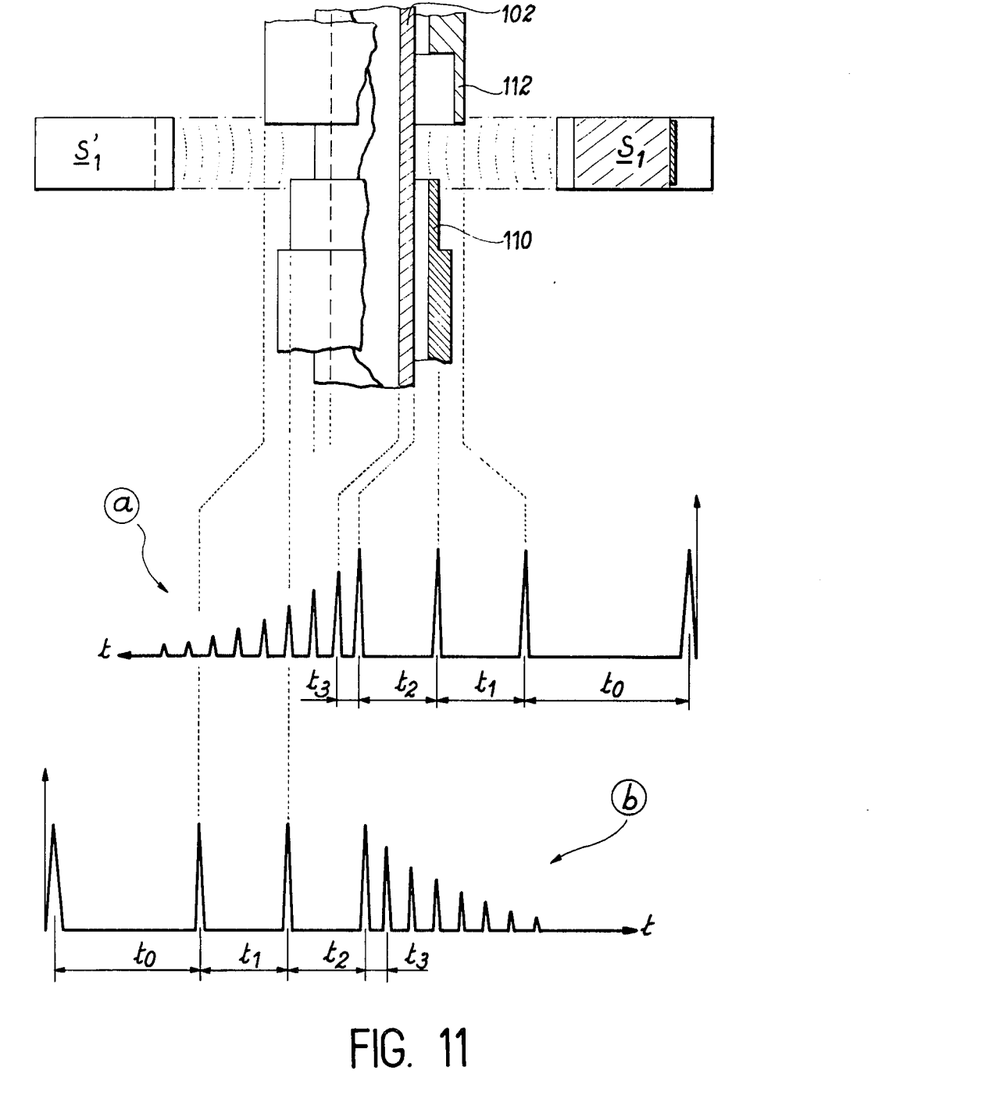
FIG. 11 is a diagram of identification of echoes.

There are shown in FIG. 11 the echoes received on the channels $a$ and $b$ of FIG. 9 in the case of the symmetrical assembly shown in FIG. 7. The time interval $t_0$ corresponds to the time which elapses between emission and reception of the first echo reflected from the obstacle 112; $t_1$ is the time interval which elapses between the instants of reception of the echoes reflected from the barriers 110 and 112; $t_2$ is the time interval which elapses between the instants of reception of the echoes reflected from the barrier 110 and the external surface of the tube 102; and $t_3$ is the time interval which elapses between the instants of reception of the echoes reflected from the two surfaces of the tube 102. The following echoes are the multiple echoes between the external and internal faces of the tube 102.

The expression "barrier" as used herein means an obstruction which does not completely obstruct the propagation of incident waves and reflects only a portion of the incident energy and allows transmission of the rest to take place through, around or past it. As shown in FIG. 11, the barriers partially obstruct the wave path and the object to be measured is located in a relatively unobstructed portion of the wave path.

What we claim is:

1. A device for the accurate measurement of dimensions of an object by ultrasonic waves, wherein said device comprises at least one ultransonic probe which operates as a transmitter-receiver for ultrasonic pulses, at least two reflecting barriers for said ultrasonic pulses, said barriers being in precisely fixed locations on the path of the ultransonic pulses so as to provide only partial obstruction of said path, means for placing, in a less obstructed portion of said path, an object whose dimensions are to be measured in the direction of propagation of the ultrasonic pulses, means for producing electric signals proportional in value to the time intervals between the reception on each probe of the various echoes corresponding to the reflections of the ultrasonic pulses from said barriers and from said object, and electronic processing means for comparing electric signals proportional to the interval between echoes corresponding to reflections from two of said barriers with electric signals proportional to the interval between echoes corresponding to reflection from different surfaces of said object and for thereby producing electric signals proportional to dimensions of said object.

2. A device according to claim 1, wherein said device comprises two ultrasonic probes (Ea and Eb) and three reflecting barriers (10, 12, 14) placed between the oppositely-disposed transmitting faces of the two probes (Ea and Eb), said object being placed between two (12,14) of said barriers.

3. A device according to claim 1, wherein said barriers are constituted by wires, screens, grids or strips.

4. A device according to claim 1, for measuring the dimensions of a hollow object showed with a couplant liquid, wherein said device comprises only a single ultransonic probe ($E_a$) and just two reflecting barriers (10,12), said barriers both being placed in positions on the path of said ultrasonic pulses produced by said probe at distances from said probe that are less than the distance of said object from said probe, and wherein said electric signal producing means are means for producing electric signals proportional in value to the time interval between reception of the respective echoes from said barriers and for producing electric signals proportional in value to the time intervals between echoes corresponding to reflections from different surfaces of said objects.

5. A device according to claim 1, for the accurate measurement of radial dimensions of a cylindrical tube, wherein said object whose dimensions are to be measured is a cylindrical tube and said device further comprises means for displacing said tube in a direction parallel to its axis, and in which further, there are N pairs of said ultrasonic probes, placed in a ring around the tube, the two probes of each pair of probes being placed opposite to each other on each side of said tube, said tube having an external radius $R_1$, the probes being disposed so as to transmit ultrasonic pulses which propagate in directions perpendicular to the generator-lines of said tube, and in which, further, said device also comprises means for sequentially switching into activity each of the N pairs of probes, and in which further, said barriers are constituted in a form capable of partially reflecting waves from any of said probes without more than partially obstructing wave pulses from said probes traveling to and from said tube, and in which, further, said electric signal producing means are means for producing electrical signals proportional to the interval between echoes respectively corresponding to reflections from said two barriers and means for producing electric signals proportional to the intervals betwen echoes corresponding respectively to reflection from different surfaces of said tube, and in which, further, said electronic processing means includes means responsive to said sequentially switching means for identifying the respective outputs of said processing means relating to each of said pairs of probes, whereby said electronic processing means is enabled to produce electric signals proportional to the external and internal radii of said tube in directions corresponding to each of said N pairs of probes.

6. A device according to claim 22, wherein the two reflecting barriers are respectively constituted by:
 a first cylindrical tube of external radius $R_2$ which is coaxial with the tube being measured, with $R_2 > R_1$, the external surface of radius $R_2$ of said first barrier being located on a portion of the emission ultrasonic field of each probe; and
 a second cylindrical tube of radius $R_3$, with $R_3 > R_2$, the external surface of radius $R_3$ of said second tube being located on a portion of the emission ultrasonic field of each probe.

7. A device according to claim 5, wherein three pairs of collectors are placed at angular intervals of 120° about the tube to be tested.

8. A device according to claim 1, wherein, said means for producing electrical signals having values proportional to the time intervals which elapse between reception on said probes (Ea and Eb) of the various echoes corresponding to the reflections of the ultrasonic pulses from said barriers and from said object comprise:
 a first time-amplitude converter ($A_a$) having an adjustable gain $K\lambda_1$ which is supplied at the input with electrical pulses corresponding to the first two ultrasonic echoes returned by said first barrier and said second barrier and received by the first probe (Ea) and which delivers at the output a signal equal to $K\lambda_1 t_1$, where $t_1$ is the time interval which elapses between the reception of the first two echoes by said first probe (Ea),
 a second time-amplitude converter ($A_b$) having an adjustable gain $\lambda$ which is supplied with electrical pulses corresponding to the two ultrasonic echoes returned by the second barrier and the external surface of the object located opposite to the first probe (Ea) and received by said first probe (Ea) and which delivers at the output a signal equal to $\lambda t_2$, where $t_2$ is the time interval which elapses between reception of said two echoes by said first probe (Ea), and a third time-amplitude converter ($A_f$) having an adjustable gain $\lambda$ which is supplied at the input with pulses corresponding to the two ultrasonic echoes returned by said third barrier and the external surface of the object located opposite to said second probe (Eb) and received by said second probe (Eb) and which delivers a signal equal to $Kt_5$, where $t_5$ is the time interval which elapses between reception of said two echoes, and in which said electronic processing means comprise:
 an adding device ($A_d$) which is supplied from the outputs of the time-amplitude converters ($A_b$) and ($A_c$) and which delivers an output signal $u_1 = \lambda(t_2 + t_5)$,
 a subtracting device ($S_a$) which is supplied at the input from the outputs of the time-amplitude converter ($A_a$) and of the adding device ($A_d$) and which delivers at the output an output signal $u_2 = K\lambda_1 t_1 - \lambda(t_2 + t_5)$, and
 an amplifier ($A_e$) supplied from the output of the subtracting device ($S_a$) and designed to deliver at the output a signal which is a linear function of the dimension of the part as measured along the direction of propagation of the ultrasonic waves.

9. A device according to claim 8, wherein the gain K of said first converter ($A_a$) is so adjusted that the output signal of said amplifier ($A_e$) has a zero value for an object having a known dimension and placed between the two barriers aforesaid.

10. A device according to claim 9, for measuring the internal and external dimensions of a hollow object, wherein said electric signal producing means further comprise:
 a fourth time-amplitude converter ($A_c$) having an adjustable gain k which is supplied at the input with electrical pulses corresponding to the two ultrasonic echoes returned by the external and internal surfaces of the object and received by the first probe (Ea) and which delivers at the output a signal equal to $kt_3$ where $t_3$ is the time interval which elapses between reception of said two echoes, and
 a fifth time-amplitude converter ($A_g$) having an adjustable gain k which is supplied at the input with electrical pulses corresponding to the two ultrasonic echoes returned by the external and internal surfaces of the object and received by the second probe (Eb) and which delivers at the output a signal equal to $kt_6$, where $t_6$ is the time interval which elapses between reception of said two echoes, and in which said amplifier ($A_e$) of said processing means is supplied from the outputs of the fourth and fifth time-amplitude converts ($A_c$) and ($A_g$) and delivers an output signal $u_3 = K(t_3 + t_6)$, and said electronic processing means further comprise:

a second subtracting device ($S_b$) which is supplied by the output signal of said amplifier and by a signal having an adjustable value $u_0$ and which delivers at the output a signal having a value equal to $u_4 = k(t_3 + t_6) - u_0$, a third subtracting device ($S_c$) which is supplied at the input from the output of the second subtracting device ($S_b$) and from the output of said amplifier ($A_e$) and delivers at the output a signal which is a linear function of the internal dimension of the object to be measured, along the direction of propagation of the ultrasonic pulses.

* * * * *